United States Patent
Leidig et al.

(10) Patent No.: US 12,504,343 B2
(45) Date of Patent: Dec. 23, 2025

(54) DEVICE FOR CHECKING A SEAL OF A PACKAGE, AND METHOD FOR CHECKING A SEAL

(71) Applicant: Syntegon Technology GmbH, Waiblingen (DE)

(72) Inventors: Juergen Leidig, Frankenhardt (DE); Florian Weber, Crailsheim (DE); Marco Härtweg, Braunsbach (DE)

(73) Assignee: Syntegon Technology GmbH, Waiblingen (DE)

( * ) Notice: Subject to any disclaimer, the term of this patent is extended or adjusted under 35 U.S.C. 154(b) by 320 days.

(21) Appl. No.: 18/255,453

(22) PCT Filed: Dec. 15, 2021

(86) PCT No.: PCT/EP2021/085856
§ 371 (c)(1),
(2) Date: Jun. 1, 2023

(87) PCT Pub. No.: WO2022/129150
PCT Pub. Date: Jun. 23, 2022

(65) Prior Publication Data
US 2024/0027296 A1 Jan. 25, 2024

(30) Foreign Application Priority Data
Dec. 15, 2020 (DE) ...................... 10 2020 133 607.1

(51) Int. Cl.
*G01M 3/02* (2006.01)
(52) U.S. Cl.
CPC ...................... *G01M 3/02* (2013.01)
(58) Field of Classification Search
CPC .......... G01M 3/02; G01M 3/143; G01M 3/38; G01M 3/147; G01N 21/9508
See application file for complete search history.

(56) References Cited

U.S. PATENT DOCUMENTS

| | | | |
|---|---|---|---|
| 5,768,138 A * | 6/1998 | Ruotolo | G05B 19/4065 700/186 |
| 2003/0033857 A1 * | 2/2003 | Franks | G01M 3/38 73/49.3 |
| 2010/0112916 A1 | 5/2010 | Epstein et al. | |

FOREIGN PATENT DOCUMENTS

| CN | 204944756 U | 1/2016 |
|---|---|---|
| CN | 109425471 A | 3/2019 |

(Continued)

OTHER PUBLICATIONS

Translation of International Search Report for Application No. PCT/EP2021/085856 dated Apr. 14, 2022 (2 pages).

(Continued)

*Primary Examiner* — David Z Huang
(74) *Attorney, Agent, or Firm* — Michael Best & Friedrich LLP

(57) ABSTRACT

The invention relates to a device (10) for checking a seal, in particular at least one sealing seam (12), of a packaging (14), the device (10) comprising a negative pressure chamber (16) configured to receive at least one packaging (14) and to generate a negative pressure in the negative pressure chamber (16), so that a packaging (14) located in the negative pressure chamber (16) aligns due to gas located in the packaging (14) and expanding as a result of the negative pressure generated in the negative pressure chamber (16), and an image capture device (18) which is designed to capture the aligned packaging (10) and/or the sealing seam (12) of the aligned packaging (10) in the form of optical, in particular digital, data, and a method for checking a seal.

19 Claims, 4 Drawing Sheets

(56) References Cited

FOREIGN PATENT DOCUMENTS

| CN | 211766773 U | 10/2020 |
| DE | 102006050417 A1 | 4/2008 |
| EP | 1333267 A1 | 8/2003 |
| GB | 2059381 A | 4/1981 |
| TW | M515100 U | 1/2016 |

OTHER PUBLICATIONS

German Patent Office Action for Application No. 102020133607.1 dated Jul. 22, 2021 (8 pages including statement of relevance).
Chinese Patent Office Action for Application No. 202180083917.0 dated Aug. 22, 2025 (14 pages including English machine translation).

* cited by examiner

DEVICE FOR CHECKING A SEAL OF A PACKAGE, AND METHOD FOR CHECKING A SEAL

BACKGROUND

The invention relates to a device for checking a seal, in particular at least one sealing seam, of a packaging having the features of the disclosure and to a method for checking a seal.

Usually, pre-sterilized pharmaceutical articles are packed in packaging bags for transport and/or storage. Parts of the packaging bags can be made of an air-permeable non-woven polyethylene fabric. It is important that these packagings and in particular the sealing seams of the packagings are and remain (air) tight and undamaged in order to be able to maintain the degree of sterilization.

As a rule, after the packaging has been sealed and checked, it is folded and stacked in boxes in multiples. The packaging of the pre-sterilized articles is stacked folded in the carton to save space. The cartons are in turn stacked on a pallet. This is then shipped to the pharmacist. The pharmacist then unpacks the pallets and cartons.

The pharmacist now has no way of automatically rechecking the seal seam before opening the packaging of the pre-sterilized articles. The seal seam may have been damaged by the folding of the packaging and transport. The pharmacist must therefore manually check the seal of each individual packaging. This is (time-)consuming and error-prone, as the pharmacist may also overlook something, especially if he has to check a large number of packagings for sealing.

SUMMARY

The task of the present invention is to provide a device and a method for inspecting a seal of a packaging while eliminating the above disadvantages.

This task is solved by a device for checking a seal, in particular at least one sealing seam, of a packaging, wherein the device comprises:

A negative pressure chamber configured to receive at least one packaging and to generate a negative pressure in the negative pressure chamber. Thereby, a packaging located in the negative pressure chamber is aligned due to gas located in the packaging and expanding as a result of the negative pressure generated in the negative pressure chamber. In other words, the gas (air, or inert gas) in the packaging expands due to the negative pressure created in the negative pressure chamber and presses against the folded packaging from the inside. The folded packaging is thus unfolded and aligned.

The negative pressure chamber can be designed as a vacuum chamber.

The device further comprises an image capture device configured to capture the aligned packaging and/or the seal seam of the aligned packaging in the form of optical, in particular digital, data.

The image capture device can, for example, be designed as a (digital) camera. The captured data can be, for example, a (digital) image or photo of the entire packaging or of parts or areas of the packaging. Likewise, the captured data may be, for example, a (digital) image or photograph of a sealing seam or a plurality of sealing seams of the packaging or individual areas of the individual sealing seams.

It is equally conceivable that the captured data is captured, for example, in the form of multiple (digital) images/photos or in the form of one video or multiple videos.

The recorded data can be checked by an operator, for example, to determine whether the seal is still intact.

It is conceivable that the image capture device can capture the optical data in a frequency range of visible light. However, it is also conceivable that the image capture device captures the optical data in a range that is not visible to the human eye, e.g. infrared or ultraviolet. The image capture device can be in the form of an infrared camera.

The pre-sterilized pharmaceutical articles may be pharmaceutical packaging materials, such as disposable syringes, vials, carpules.

The device can have an evaluation device which is designed to evaluate the optical data recorded by means of the image capture device in order to be able to determine, on the basis of the evaluated data, whether the seal and/or the sealing seam of the packaging have been broken.

This can be realized in particular by comparing with predetermined values. If a deviation of the evaluated data from the predetermined values is detected, a damaged packaging and/or sealing seam can be concluded. The evaluation device can be in the form of a computer.

The image capture device may be arranged inside the negative pressure chamber. The image capture device can be arranged within the negative pressure chamber in such a way that no wall of the negative pressure chamber is arranged between the image capture device and the packaging to be inspected within the negative pressure chamber. Thus, the negative pressure chamber can be made of solid material that is optically impenetrable for the image capture device. This makes it possible to build up a large negative pressure, whereby the stability of the negative pressure chamber can be ensured by, for example, solid construction made of metal (e.g. steel).

However, it is also conceivable that the image pickup device is arranged outside the negative pressure chamber. In this case, it must be ensured that there are no obstacles in the capture horizon of the image capture device that are optically impenetrable for the image capture device. These could prevent or hinder the optical detection of the data by means of the image capture device.

At least one wall of the negative pressure chamber can be formed at least partially from a material that is transparent to the image capture device. Such a material may be, for example, glass or acrylic. Whether or not a material is transparent to the imaging capture device depends on the optical frequency spectrum in which the imaging capture device operates. For example, glass is transparent to near infrared light, but not transparent to far infrared light.

The device can have an illumination device. This can be designed to illuminate the packaging and/or the sealing seam. The illumination device (as well as the image capture device) can be arranged inside or outside the negative pressure chamber. By illuminating the packaging and/or the sealed seam, the capturing of the optical data of the packaging and/or the sealed seam by means of the image capture device can be optimized.

In particular, the illumination device and the image capture device may be arranged in a common housing.

The device can have at least one transport device. This can be designed to transport the packaging towards the negative pressure chamber, through the negative pressure chamber and/or away from the negative pressure chamber. Thus, the packagings can be automatically fed to the negative pressure chamber, guided through the negative pressure chamber, and/or discharged from the negative pressure chamber. In particular, the transport device can be designed as a conveyor belt or comprise at least one conveyor belt.

In particular, the transport device can comprise a first conveyor belt that feeds the packagings to the negative pressure chamber. In particular, the transport device may comprise a second conveyor belt which guides the packagings through the negative pressure chamber. In particular, the transport device may comprise a third conveyor belt that discharges the packagings from the negative pressure chamber.

The negative pressure chamber can have at least one airtight door. This can be designed to be able to move the packaging into the negative pressure chamber and/or out of the negative pressure chamber. In particular, the negative pressure chamber may have two airtight doors configured to move the packaging into the negative pressure chamber and/or out of the negative pressure chamber.

The device can have at least one fixing device. The fixing device can be designed to fix the aligned packaging in the aligned state. The fixing device can be arranged inside the negative pressure chamber.

If the negative pressure is released from the negative pressure chamber, or if the negative pressure inside the negative pressure chamber is adjusted to the (normal) pressure outside the negative pressure chamber, this pressure change can cause the aligned packaging to return to a folded state. In other words, due to pressure fluctuations and/or pressure differences in the negative pressure chamber, the packaging may again form folds.

The fixing device can be designed as at least one clamping plate, in particular as two clamping plates which can be moved relative to each other. In this way, the usually rectangular packaging can be prevented from moving backwards on the side (to be cut open later) along its entire length.

In other words, fixing the packaging in the aligned state by means of the fixing device prevents, in particular, the aligned packaging, in particular one side of the packaging, from folding back in after the pressure conditions have changed, and enables optional, subsequent safe opening of the packaging.

In this way, optional opening of the packaging following alignment can be optimized. For example, the packaging can be opened along an unfolded seal seam or parallel to it. This can prevent the pre-sterilized articles inside the packaging from being damaged during opening.

The device can have a reject device. This can be designed to reject a packaging in which a break in the seal and/or the sealed seam has been detected by means of the evaluation device. The reject device can, for example, comprise an element which conveys the packaging to be rejected from a conveyor belt.

It is also conceivable that an alarm device is provided which sounds an alarm, e.g. in the form of an acoustic and/or visual signal, as soon as a break in the seal and/or the sealed seam has been detected by means of the evaluation device.

Further, the task to be solved is solved by a method for checking a seal, in particular at least one sealing seam, of a packaging the method comprising the steps:

Placing the packaging in a negative pressure chamber. This can be done manually by an operator or automatically, for example by means of a transport device. When placed in the negative pressure chamber, the packaging is in a folded state due to transport (stacked in boxes).

Generating a negative pressure within the negative pressure chamber, wherein the packaging located within the negative pressure chamber expands due to gas located within the packaging and expanding as a result of the negative pressure created within the negative pressure chamber. In other words, the gas (especially air or inert gas) inside the packaging expands due to the negative pressure in the negative pressure chamber. In the process, the expanding gas presses against the folded packaging from the inside and thus aligns or unfolds it.

Capturing the aligned packaging and/or the sealing seam of the aligned packaging in the form of optical, in particular digital, data. This can be realized by means of an image capture device, such as a (digital) camera. Thereby, the optical data can be captured in the form of at least one (digital) image/photo and/or at least one video.

Evaluating the captured optical data, in particular by comparing it with predetermined values, to determine whether the seal and/or the sealing seam of the packaging have been broken. The comparison of the captured optical data can be done manually, for example by viewing a (digital) image or photo by an operator. It is also conceivable that the evaluation is automated, for example by means of an evaluation device (e.g. a computer).

During the step:
Capturing the aligned packaging and/or the sealing seam of the aligned packaging in the form of optical, in particular digital, data, the aligned packaging and/or the sealing seam of the aligned packaging can be illuminated, in particular by means of an illumination device.

The method may further comprise the step of:
Fixing the aligned packaging so that the aligned packaging remains in the aligned state.

In this aligned (unfolded) and fixed state, the packaging is easier to open, as the folds of the packaging in the folded state can hinder safe opening of the packaging. This can ensure, for example, that the pre-sterilized articles within the packaging are not damaged by opening, for example using a cutting tool. The packaging can be opened manually, for example by an operator. However, automated opening of the packaging can also be provided, for example.

The method may further comprise the step of:
Sorting out the packaging where breaking of the seal and/or the sealing seam has been detected.

Sorting can be carried out manually by an operator, for example. It is also conceivable that sorting is automated, for example by means of a reject device.

The method can be carried out with a device having the above features.

BRIEF DESCRIPTION OF THE DRAWINGS

Further features, details and advantages of the invention are apparent from the wording of the claims and from the following description of embodiments based on the drawings. Showing:

DETAILED DESCRIPTION

In the following description and in the figures, the corresponding components and elements have the same reference signs. For the sake of clarity, not all reference signs are shown in all figures.

Figure 1:
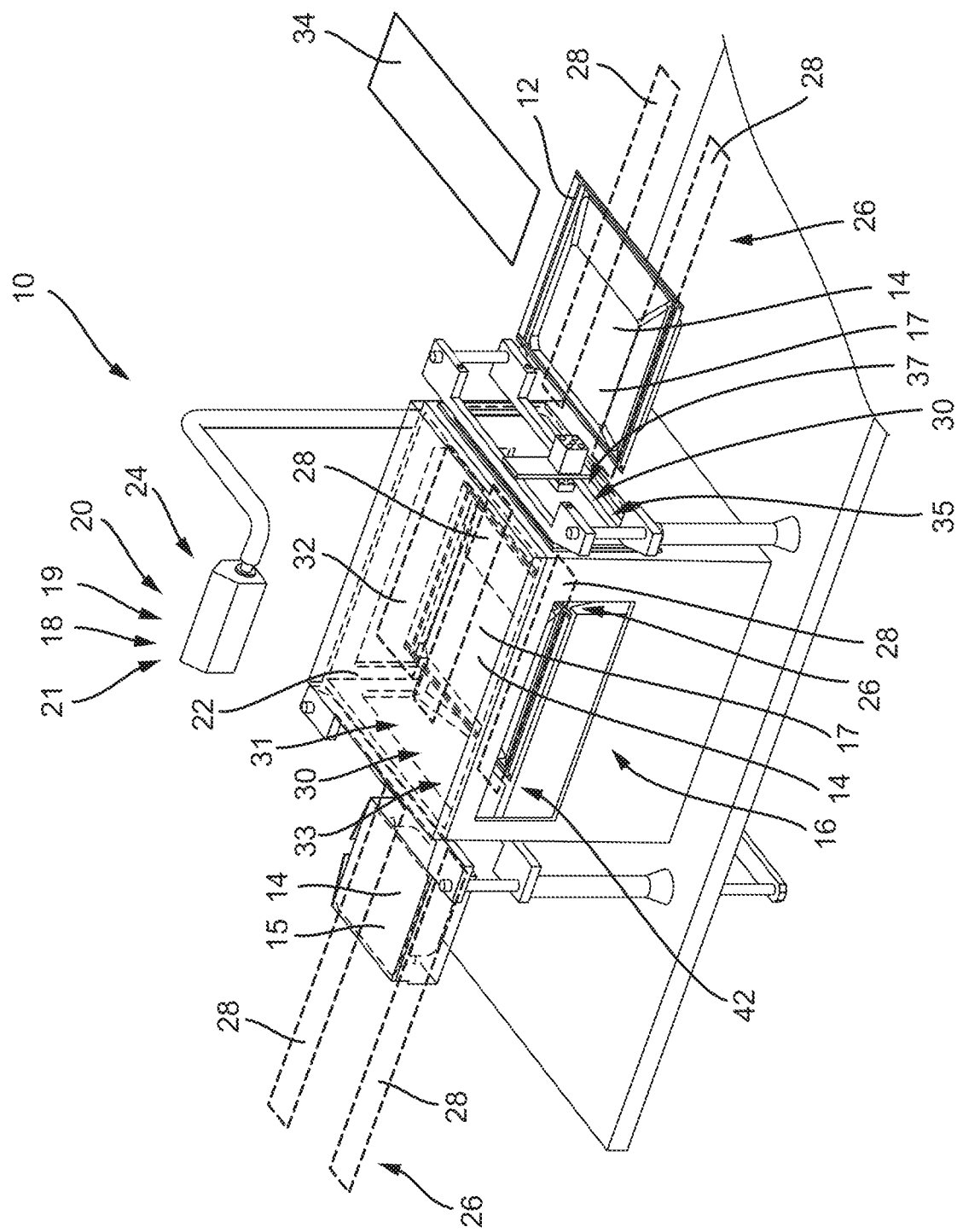
FIG. 1 a perspective view of a device for checking a seal of a packaging.

FIG. 1 shows a perspective view of a device 10 for checking a seal, in particular a sealing seam 12 of a packaging 14.

The device 10 has a negative pressure chamber 16. This is designed to generate negative pressure and to receive at least one packaging 14. The packaging 14 is fed to the negative pressure chamber 16 in the folded state 15. In other words, the packaging 14 is placed in the negative pressure chamber 16 in the folded state 15. The packaging 14 shown in FIGS. 1 and 2 within the negative pressure chamber 16 is already in an unfolded state 17.

By generating the negative pressure in the negative pressure chamber, the gas contained in the packaging 14 expands. As it does so, the extending (expanding) gas presses against the packaging 14 from the inside, causing the packaging 14 to unfold. In other words, the packaging 14 is thereby aligned.

The sealing and/or the sealing seam 12 of the packaging 14 now in the aligned state 17 can be checked. For this purpose, optical, in particular digital, data of the packaging 14 in the aligned state 17 are captured by means of an image capture device 18.

In the present case, the image capture device 18 is designed in the form of a digital camera 19. The optical data is captured in the form of a (digital) image/photo.

In the present case, the digital camera 19 is arranged outside and above the negative pressure chamber 16. The digital camera 19 is aligned in such a way that it can capture a digital image (photo) from above of the packaging 14 in the aligned state 17.

In the embodiment shown, the digital image captured by the digital camera 19 is transmitted to an evaluation device 20. The evaluation device 20 is designed to evaluate the data captured by the digital camera 19. This can be realized, for example, by comparison with predetermined values.

For example, the shape of the packaging 14 when unfolded 17 may represent such a value. If a packaging 14 has been damaged, the gas contained in the packaging 14 would escape from the packaging 14 through the damaged area when the negative pressure is generated in the negative pressure chamber 16. As a result, the packaging 14 would not be unfolded, or at least not unfolded sufficiently. It is therefore conceivable that the evaluation device 20 checks whether the detected shape of the packaging 14 in the unfolded state 17 corresponds to the predetermined shape of the packaging 14 in the unfolded state 17. In case of a correspondingly large deviation, it can be concluded that the packaging 14 is damaged.

Another such value may be, for example, a color and/or contrast value. The sealing seam 12 may stand out from the rest of the packaging 14 in terms of color and, in particular, contrast. To enhance this effect, the packaging 14 may have a uniform, in particular silver, outer coloration. The sealing seam 12, which is usually a depression or elevation relative to the surface of the packaging 14, stands out from the (e.g., silver) outer coloring of the packaging 14 by having a dark/darker coloring or a high/higher contrast value. Thus, the shape of the sealed seam 12 can be accurately detected and compared with a predetermined shape.

If, for example, the detected shape of the sealing seam 12 corresponds to a line, in particular with a thickness that remains constant along the line, it can be concluded that the sealing seam 12 is undamaged. If the detected shape of the sealed seam 12 deviates (significantly) from the specified shape, it can be concluded that the sealed seam 12 is damaged.

If, for example, the detected shape of the sealed seam 12 does not correspond to a line, a certain course of a line and/or if the line shape of the sealed seam 12 has unequal thicknesses, it can be concluded that the sealed seam 12 is damaged.

Likewise, damage to the packaging can also represent such a color and/or contrast value.

This effect can be further enhanced by appropriate illumination of the sealing seam 12 or the packaging 14. For this purpose, an illumination device 24 is provided on the device 10.

In the present case, the illumination device 24 is arranged in the immediate vicinity of the digital camera 19. In this way, the illumination device 24 can optimally illuminate the detection area of the digital camera 19.

The digital camera 19, the evaluation device 20 and the illumination device 24 are arranged in a housing 21. This results in a compact design.

In addition, there is the advantage that the individual components, in particular the digital camera 19 and the illumination device 24, only have to be adjusted to each other once. If, for example, the detection area of the digital camera 19 is changed by repositioning, rotating and/or tilting the digital camera 19, an alignment/adjustment of the illumination device 24 is unnecessary. Since this is arranged in the same housing 21, the illumination device 24 is repositioned, rotated and/or tilted together with the digital camera 19 so that the optimally adjusted illumination of the detection area of the digital camera 19 remains optimally illuminated.

The negative pressure chamber 16 is designed in the present case in the form of a cuboid. The negative pressure chamber 16 has a wall 22 which is transparent to the image capture device 18. In other words, the wall 22 is made of a material (e.g., glass) that is transparent to the image capture device 18. The wall 22 is disposed between the packaging 14 placed in the negative pressure chamber 16 and the digital camera 19 (or illumination device 24 and evaluation device 20). In other words, the wall 22 forms the upper side of the negative pressure chamber 16 formed as a cuboid.

The negative pressure chamber 16 has two airtight doors 30. A first airtight door 31 is arranged on a first side wall 33 of the negative pressure chamber 16. The first side wall 33 forms a first side of the negative pressure chamber 16, which is designed as a cuboid.

The first airtight door 31 is configured to move or transport the packaging 14 into the negative pressure chamber 16.

The negative pressure chamber 16 has a second airtight door 35. This is arranged on a second side wall 37. The second side wall 37 is arranged opposite the first side wall 33. The second airtight door 35 is configured to move or transport the packaging 14 out of the negative pressure chamber 16.

Figure 2:
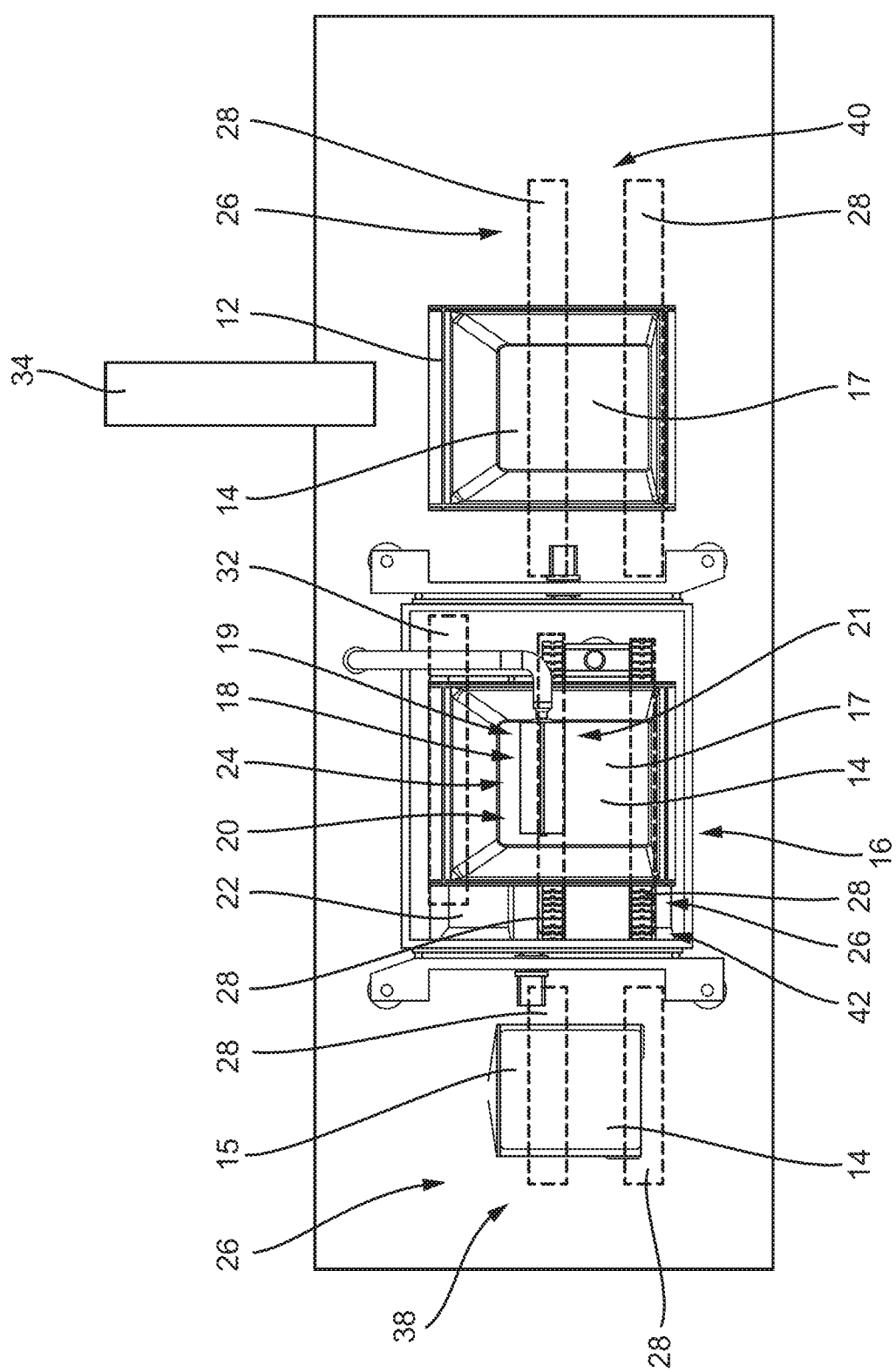
FIG. 2 a top view of the device according to FIG. 1.

FIG. 2 shows a top view of the device 10 according to FIG. 1.

The device 10 further comprises a transport device 26. The transport device 26 comprises several conveyor belts 28, which are only indicated by dashed lines in FIGS. 1 and 2.

Two conveyor belts 28 are arranged outside the negative pressure chamber 16 (on the left in FIG. 2) and form the feed 38 to the negative pressure chamber 16. The packaging 14 in the folded state 15 is fed by means of the feed 38 to the negative pressure chamber 16 through the first airtight door 31 (shown in FIG. 1).

On the opposite side of the negative pressure chamber 16 (on the right in FIG. 2), two further conveyor belts 28 are arranged outside the negative pressure chamber 16. These form the discharge 40 from the negative pressure chamber 16. In the present case, the packaging 14 in the unfolded state 17 is transported away from the negative pressure chamber 16 by means of the discharge 40. To remove the packaging 14 by means of the discharge 40, it is discharged from the negative pressure chamber 16 through the second airtight door 35 (shown in FIG. 1).

Two further conveyor belts 28 are arranged inside the negative pressure chamber 16. These form the transfer device 42. The transfer device 42 is designed to transport the packaging 14 from the first airtight door 31 through the negative pressure chamber 16 to the second airtight door 35.

The device 10 also has a reject device 34. This is only schematically indicated in FIGS. 1 and 2.

The reject device 34 is configured to convey a packaging 14 identified as damaged from the conveyor belts 28 of the discharge 40 (for example, into a reject bin not shown).

In the simplest case, this can be accomplished mechanically by applying a force to the packaging 14 transverse to the direction of travel of the conveyor belts 28 of the discharge 40. In other words, the packaging 14 identified as damaged can be pushed off the conveyor belts 28 of the discharge 40 by means of the reject device 34.

The packaging 15, on the other hand, for which no damage could be determined, is transported on past the reject device 34 by means of the conveyor belt 28 of the discharge 40.

The device 10 further comprises a fixing device 32. The fixing device 32 is configured to fix the aligned packaging 14 in the aligned state 17.

The fixing device 32 is only indicated by dashed lines in FIGS. 1 and 2. The fixing device 32 is arranged inside the negative pressure chamber 16 and can be designed, for example, as a clamping plate. The fixing device 32 fixes, for example by clamping, the packaging 14 in the aligned state 17 in the negative pressure chamber 16.

This can ensure that the aligned packaging 14 (for example, due to pressure fluctuations and/or pressure differences in the negative pressure chamber 16) does not form folds again or does not return to the folded state 15.

Figure 3:
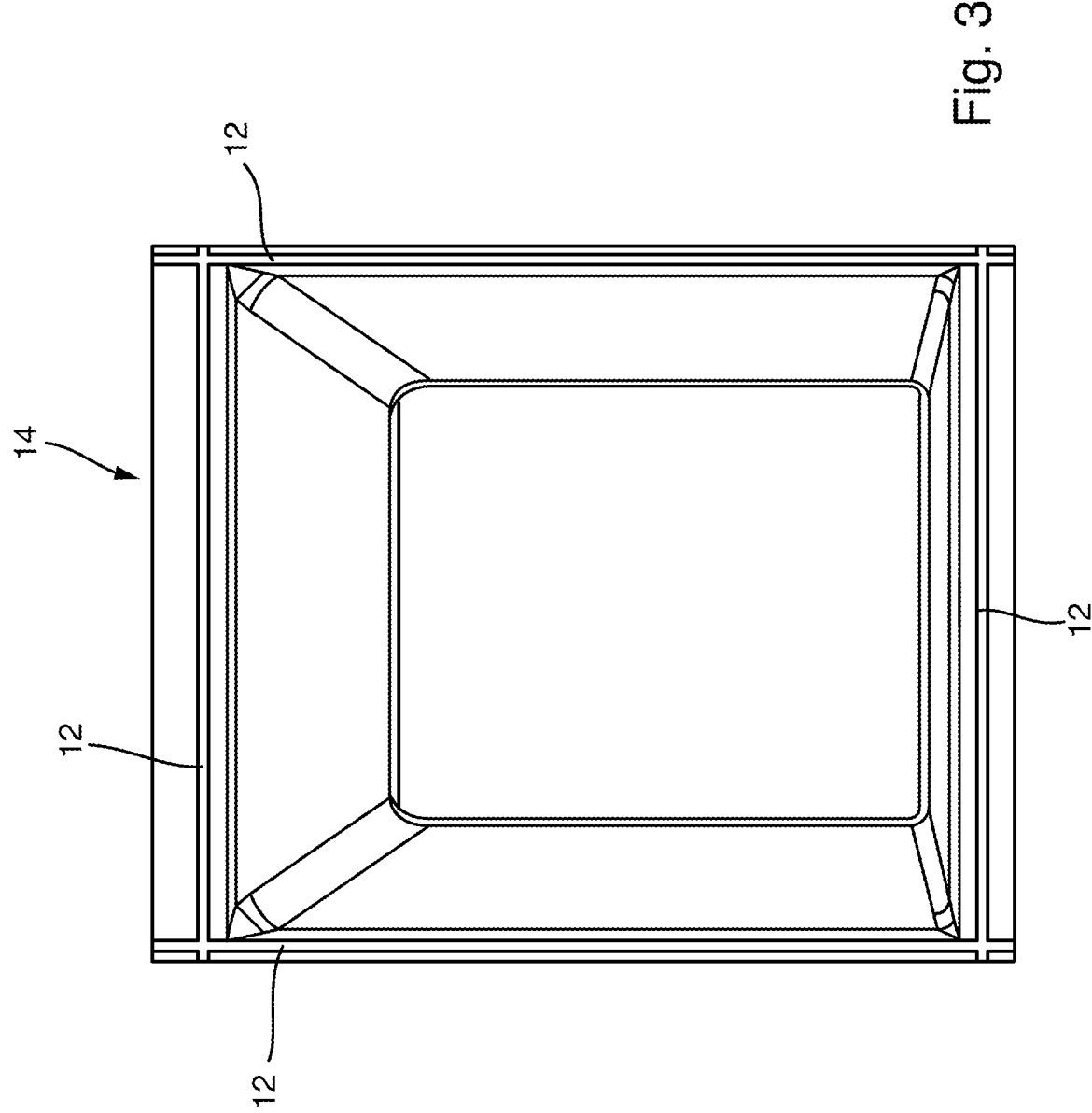
FIG. 3 a top view of a schematic representation of a packaging in the aligned state, and FIG. 4 a perspective view of a further embodiment of a packaging with pre-sterilized articles packaged therein.

FIG. 3 shows a top view of a schematic representation of a packaging 14 in an unfolded state 17. The illustrated packaging 14 is intended to schematically illustrate the aligned state 17. In the unfolded state 17, the illustrated packaging 14 has a rectangular shape and four sealing seams 12 each extending along one side of the packaging 14. The sealing seams 12 are substantially in the form of straight extending lines.

Figure 4:
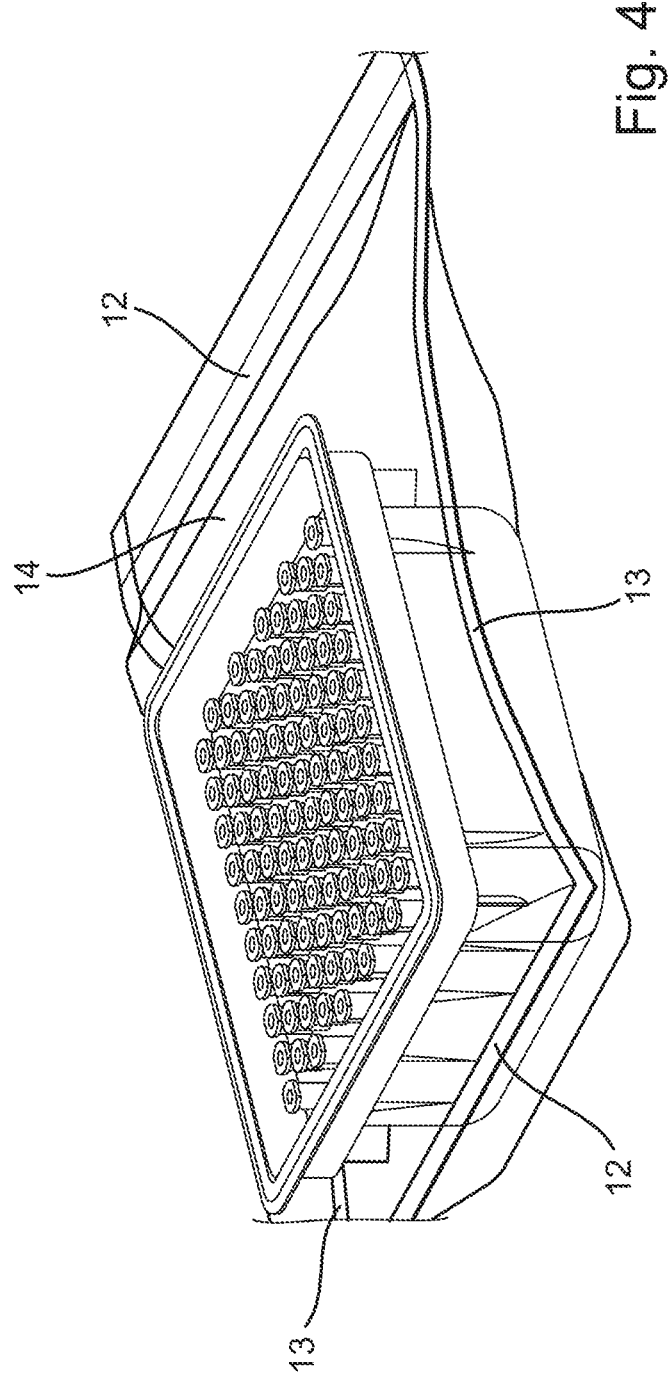

FIG. 4 shows a perspective view of a packaging 14 with pre-sterilized articles packaged therein. Shown is the aligned state 17 of the packaging 14. The packaging 14 shown has a basic rectangular shape. Due to the pre-sterilized articles in the packaging 14 curving the packaging 14 outwardly, the side seal seams 13 have a corresponding curvature toward the center of the packaging 14.

In other words, the illustrated packaging 14 has, in the aligned state 17 (shown), two seal seams 12 that are substantially in the form of a straight line and two side seal seams 13 that are substantially in the form of a curved line. However, the seal seams 13 may also have the form of a substantially straight line.

What is claimed is:

1. A device (10) for checking at least one sealing seam (12), of a folded packaging (14), the device (10) comprising:
    a negative pressure chamber (16), which is configured to receive at least one packaging (14) and to generate a negative pressure in the negative pressure chamber (16), so that a packaging (14) located in the negative pressure chamber (16) is aligned due to gas located in the packaging (14) and expanding as a result of the negative pressure generated in the negative pressure chamber (16),
    wherein the device (10) comprises an image capture device (18) which is configured to capture the aligned packaging (10) and/or the sealing seam (12) of the aligned packaging (10) in the form of optical data, the captured data being captured as an image or a video of the entire packaging, parts of the packaging, the sealing seam, a plurality of sealing seams or individual regions of the individual sealing seams, to determine whether a seal is still intact,
    wherein the device (10) comprises at least one clamping plate (32), the clamping plate (32) being configured to fix the aligned packaging (14) in an aligned state (17) and being configured such that pressure fluctuations or pressure differences in the negative pressure chamber (16) do not form folds in the folded packaging (14) or cause the folded packaging (14) to return to a folded state from the aligned state.

2. The device (10) according to claim 1, wherein the device (10) has an evaluation device (20) which is configured to evaluate the optical data captured by the image capture device (18) in order to determine, on the basis of the evaluated data, whether the seal and/or the sealing seam (12) of the packaging (14) have been broken.

3. The device (10) according to claim 2, wherein evaluating the optical data captured by the image capture device (18) includes comparing the optical data with predetermined values.

4. The device (10) according to claim 1, wherein the image capture device (18) is arranged inside the negative pressure chamber (16).

5. The device (10) according to claim 1, wherein the image capture device (18) is arranged outside the negative pressure chamber (16).

6. The device (10) according to claim 1, wherein at least one wall (22) of the negative pressure chamber (16) is formed at least partially from a material which is transparent for the image capture device (18).

7. The device (10) according to claim 6, wherein the at least one wall (22) of the negative pressure chamber (16) is formed of glass.

8. The device (10) according to claim 1, wherein the device (10) comprises an illumination device (24) configured to illuminate the packaging (14) and/or the sealing seam (12).

9. The device (10) according to claim 1, wherein the device (10) comprises at least one transport device (26), wherein the transport device (26) is configured to transport the packaging (14) towards the negative pressure chamber (16), through the negative pressure chamber (16) and/or away from the negative pressure chamber (16).

10. The device (10) according to claim 9, wherein the at least one transport device (26) includes a conveyor belt (28).

11. The device (10) according to claim 1, wherein the negative pressure chamber (16) comprises at least one airtight door (30, 31, 35) configured to be able to move the packaging (14) into the negative pressure chamber (16) and/or out of the negative pressure chamber (16).

12. The device (10) according to claim 11, wherein the negative pressure chamber (16) comprises two airtight doors (30, 31, 35).

13. The device (10) according to claim 1, wherein the device (10) has a reject device (34) which is configured to reject a packaging (14) in which a breaking of the seal and/or the sealing seam (12) has been detected by the evaluation device (20).

14. The device (10) according to claim 1, wherein the optical data is digital optical data.

15. A method for checking at least one sealing seam (12), of a folded packaging (14), comprising the steps:
   placing the folded packaging (14) in a negative pressure chamber (16),
   generating a negative pressure inside the negative pressure chamber (16), the packaging (14) located in the negative pressure chamber (16) being aligned due to gas located in the packaging (14) and expanding as a result of the negative pressure generated in the negative pressure chamber (16),
   fixing the aligned packaging (14) with a clamping plate (32) so that the aligned packaging (14) remains in an aligned state and so that pressure fluctuations or pressure differences in the negative pressure chamber (16) do not form folds in the folded packaging (14) or cause the folded packaging (14) to return to a folded state from the aligned state,
   capturing the aligned packaging (10) and/or the sealing seam (12) of the aligned packaging (10) in the form of optical data,
   evaluating the captured optical data to determine whether a seal and/or the sealing seam (12) of the packaging (14) have been broken,
   wherein the captured data being captured in the form of an image or a video of the entire packaging, parts of the packaging, the sealing seam, a plurality of sealing seams or individual regions of the individual sealing seams, to determine whether the seal is still intact.

16. The method according to claim 15, wherein during the step of:
   capturing the aligned packaging (10) and/or the sealing seam (12) of the aligned packaging (10) in the form of optical data, the aligned packaging (10) and/or the sealing seam (12) of the aligned packaging (10) is illuminated by an illumination device (24).

17. The method according to claim 15, wherein the method comprises the step of:
   sorting out the packaging (14) in which breaking of the seal and/or the sealing seam (12) has been detected.

18. The method according to claim 15, wherein the optical data is digital optical data.

19. The method according to claim 15, wherein evaluating the optical data includes comparing the optical data with predetermined values.

* * * * *